United States Patent [19]

Utsumi et al.

[11] Patent Number: 5,729,281
[45] Date of Patent: Mar. 17, 1998

[54] CATV SYSTEM IN WHICH CHANEL SELECTION SIGNAL IS TRANSMITTED FROM THE SUBSCRIBER LOCATION

[75] Inventors: Kuniaki Utsumi, Sanda; Hiroyuki Sasai, Ikoma; Hiroaki Yamamoto, Higashiosaka; Manabu Tanabe, Tanabe; Katsuyuki Fujito, Higashiosaka, all of Japan

[73] Assignee: Matsushita Electric Industrial Co., Ltd., Osaka, Japan

[21] Appl. No.: 443,699

[22] Filed: May 18, 1995

[30] Foreign Application Priority Data

May 23, 1994 [JP] Japan .................... 6-108704

[51] Int. Cl.$^6$ .................. H04N 7/173; H04N 7/14
[52] U.S. Cl. .................. 348/12; 348/13; 455/4.2
[58] Field of Search .................. 348/6, 7, 10, 12, 348/13; 455/42, 3.1, 4.1

[56] References Cited

U.S. PATENT DOCUMENTS

| | | | |
|---|---|---|---|
| 4,994,909 | 2/1991 | Graves et al. | 348/7 |
| 5,421,030 | 5/1995 | Baran | 455/5.1 |
| 5,448,555 | 9/1995 | Bremer et al. | 370/20 |
| 5,481,757 | 1/1996 | Mihara et al. | 455/4.2 |

OTHER PUBLICATIONS

39th Annual Convention and Exposition of the National Cable Television Association, May 21–23, 1990, "HDTV MUSE Signals on Cables and Optical Fibers", pp. 160–168. Yozo Utsumi et al.

*Primary Examiner*—Glenton B. Burgess
*Assistant Examiner*—Nathan J. Flynn
*Attorney, Agent, or Firm*—Wenderoth, Lind & Ponack

[57] ABSTRACT

A center station 1 generates an all-channel signal 2 obtained by multiplexing signals on all channels, and transmits the signals to a selective distribution station 10 through 1 wire transmission line such as an optical fiber. Subscribers' transmitting devices $40_1$ to $40_N$ transmit requests for channels to be received by corresponding subscribers' receiving devices $30_1$ to $30_N$ to the selective distribution station 10 in a radio transmission system. The selective distribution station 10 selects the signals on the channels requested from the all-channel signal 2 in response to requests to receive channels serving as up-signals transmitted in a radio transmission system from the subscribers' transmitting devices $40_1$ to $40_N$, and distributes and transmits the selected signals to the subscribers' receiving devices $30_1$ to $30_N$ as down-signals.

19 Claims, 11 Drawing Sheets

CATV SYSTEM IN WHICH CHANEL SELECTION SIGNAL IS TRANSMITTED FROM THE SUBSCRIBER LOCATION

BACKGROUND OF THE INVENTION

1. Field of the Invention

The present invention relates generally to CATV systems, and more particularly, to a CATV system capable of selecting signals from predetermined channels out of signals from a plurality of channels and distributing and transmitting the selected signals in response to requests from subscribers.

2. Description of the Background Art

In a conventional CATV (Cable Television) system, a system as shown in the block diagram of FIG. 12 is generally used for transmitting data to each of the subscribers. In FIG. 12, the CATV system comprises a center station 1, a relay amplifying device 50 connected to the center station 1, N subscriber's devices (N is an integer) $60_1$ to $60_N$ connected to the relay amplifying device 50 in a bus shape arrangement. An all-channel signal 2, obtained by frequency-division multiplexing signals on all channels, is sent to the relay amplifying device 50 from the center station 1. The relay amplifying device 50 amplifies the all-channel signal 2 and transmits the amplified signal to each of the subscriber's devices $60_1$ to $60_N$.

In the conventional CATV system as described above, the relay amplifying device 50 only amplifies and branches the all-channel signal 2, whereby the same signal as the all-channel signal 2 is transmitted to the subscriber's devices $60_1$ to $60_N$. In each of the subscriber's devices $60_1$ to $60_N$, therefore, a desired image signal or the like can be received by tuning and selecting a desired channel.

In the above described conventional CATV system, the all-channel signal reaches each of the subscriber's devices, however there is always the possibility that the subscription broadcasting is tapped. In addition, if the number of channels to be distributed and transmitted is increased, the rate of the transmission of data is limited depending on the performance of the existing transmission line. In order to transmit signals on an increased number of channels to exceed the performance of the existing transmission line, therefore, the existing transmission line must be replaced with a transmission line having higher performance, or a transmission line must be newly laid which would result in high facility costs.

If the CATV system shown in FIG. 12 is changed into a system for transmitting only those signals requested from subscribers, such as a video on demand, however, it is not feasible to transmit up-signals for transmitting requests using the same transmission line as that used for transmitting down-signals. The reason for this is that receiving request signals collide on the transmission line when a plurality of subscriber's devices simultaneously issue requests for receiving because a large number of bands cannot be assigned for transmitting the receiving request signals in order to ensure the transmission capacity of the down-signals, that is, the signals on the respective channels, and the subscriber's devices $60_1$ to $60_N$ are connected to the relay amplifying device 50 in a bus shape.

Therefore, a transmission line for up-signals is separately laid. If the transmission line for up-signals is shared among a plurality of subscriber's devices, however, funneled noise generally becomes a large problem. If the CATV system is constructed such that a hub is provided between a center station and the subscriber's devices, an all-channel signal is transmitted from the center station to the hub, and only signals selected by subscribers are respectively transmitted from the hub to the subscriber's devices, as described in an article by Y. Utsumi et. al, "HDTV MUSE Signals on Cables and Optical Fibers", 1990 *NCTA TECHNICAL PAPERS*, pp. 160–168. The danger of tapping is thus eliminated, thereby making it relatively easy to increase the number of channels to be distributed and transmitted. If the transmission line is a coaxial cable, however, problems such as the necessity of having an up-transmission line and funneled noise remain. If the hub and each of the subscriber's devices are connected to each other so as to have a one-to-one correspondence, the problem of the funneled noise is solved. However, the cost of the transmission line further rises. If an optical fiber is used for the transmission line, there is no problem of the funneled noise. However, the cost of the transmission line significantly rises due to the necessity for an optical component for two-way transmission, a light emitting element for up-signals, and the like. Conventionally, the up-signals have been generally transmitted to the center station 1 using a public telephone line. In such a construction, however, a charge for use of the telephone line must be paid for each request for receiving made.

SUMMARY OF THE INVENTION

An object of the present invention is to provide a versatile CATV system capable of realizing an up-signal system while maintaining a low-cost plant and equipment investment.

The present invention is directed to a CATV system for distributing and transmitting signals on a plurality of channels to a plurality of subscribers through a wire transmission line, which comprises a center station, a plurality of subscriber's receiving devices, subscriber's transmitting devices, and a selective distribution station. The center station generates the signals on the plurality of channels. The subscriber's transmitting devices transmit requests for channels to be received by the corresponding subscriber's receiving devices to the selective distribution station as up-signals by radio frequencies. The selective distribution station selectively distributes and transmits the signals on the respective channels generated in the center station to the subscriber's receiving devices on the basis of the requests for channels to be received from the subscriber's transmitting devices. Since the up-signals, which are requests for receiving from the respective subscribers, are transmitted by radio signals, a transmission line for the up-signals need not be newly provided, resulting in low facility cost. Further, no public telephone network is used for transmitting the up-signals, thereby eliminating any charge for use of a telephone line. In addition, only the signal on the channel requested to be received is transmitted from the selective distribution station to the subscriber's receiving device, thereby making it possible to avoid the danger that subscription broadcasting is tapped in the subscriber's receiving device. Furthermore, no wide-band transmission line is required between the selective distribution station and the subscriber's receiving devices.

An all-channel signal, obtained by multiplexing the signals of all the channels, may be transmitted to the selective distribution station from the center station. In this case, the selective distribution station selects the signal from the channel requested from the all-channel signal in response to the request for a channel to be received from the subscriber's transmitting device and transmits the selected signal to the subscriber's receiving device.

Only the signal from the requested channel may be transmitted instead of transmitting the all-channel signal to the selective distribution station from the center station. Specifically, the selective distribution station requests the center station to transmit the signal from the requested channel in response to the request for a channel to be received from the subscriber's transmitting device, and transmits the signal on the channel received from the center station to the subscriber's receiving device corresponding to the subscriber's transmitting device issuing the request for a channel to be received. In this case, the center station need not transmit the all-channel signal to the selective distribution station, thereby eliminating the necessity for a wideband transmission line between the center station and the selective distribution station. Further, a plurality of selective distribution stations and the center station can be connected to each other by a transmission line in a tree shape or a bus shape arrangement, thereby reducing the overall length of the transmission line.

Furthermore, the subscriber's receiving devices may have previously been assigned respective frequency bands for down-signals, which differ from each other, in order to connect the subscriber's receiving devices to the selective distribution station through one transmission line in a bus shape arrangement. In this case, the selective distribution station frequency-division multiplexes the signals of the plurality of channels to be transmitted to the subscriber's receiving devices by utilizing the frequency bands respectively assigned to the subscriber's receiving devices, and then transmits the frequency-division multiplexed signals to the subscriber's receiving devices through the transmission line in a bus shape arrangement. The subscriber's receiving devices receive the signals in the frequency bands respectively assigned thereto, thereby acquiring the signals of the requested channels. Since the selective distribution station and the subscriber's receiving devices are connected to each other by one transmission line arranged in a bus shape, reduction of the overall length of the transmission line is made possible. In addition, only one transmitter is necessary on the side of the selective distribution station. Further, only one transmission line is connected to the selective distribution station, whereby the physical dimensions of an outlet for a transmission line in the selective distribution station are decreased, thereby making it possible to miniaturize the selective distribution station. Since frequency-division multiplexing is employed, it is feasible to add a subscriber's receiving device if there is room for the frequency bands, and the position where the subscriber's receiving device is connected to the transmission line is not restricted.

Various shapes can be employed for the signal transmission between the center station and the selective distribution station.

In one example, the signals on the plurality of channels are transmitted in the shape of a baseband signal or an intermediate frequency signal to the selective distribution station from the center station. The selective distribution station selects the signals on the requested channels, modulates the selected signals of the respective channels in the frequency bands respectively assigned to the subscriber's receiving devices, and then frequency-division multiplexes the modulated signals and transmits the signals to the transmission line as down-signals.

In another example, a TDM digital signal obtained by time-division multiplexing the signals of the plurality of channels is transmitted to the selective distribution station from the center station. The selective distribution station selects the signals of the channels requested to be received from the TDM digital signal, and modulates the selected signals on the respective channels in the frequency bands respectively assigned to the subscriber's receiving devices as digital signals, or after converting the digital signals into analog signals, and then frequency-division multiplexes the modulated signals and transmits the signals to the transmission line as down-signals.

In still another example, an FDM signal obtained by frequency-division multiplexing the signals on the plurality of channels is transmitted to the selective distribution station from the center station. The selective distribution station selects the signals of the channels requested to be received from the FDM signal in the shape of a baseband signal or an intermediate frequency signal, modulates the selected signals on the respective channels in the frequency bands respectively assigned to the subscriber's receiving devices, and then frequency-division multiplexes the modulated signals and transmits the signals to the transmission line as down-signals.

In a further example, an FDM signal obtained by frequency division multiplexing the signals of the plurality of channels is transmitted to the selective distribution station from the center station. The selective distribution station selects the signals of the channels requested to be received from the FDM signal, up-converts or down-converts the selected signals of the respective channels into signals in the frequency bands respectively assigned to the subscriber's receiving devices, and then frequency-division multiplexes the converted signals and transmits the signals to the transmission line as down-signals.

Frequency bands for television broadcasting signals may be assigned as the frequency bands for down-signals. Consequently, the selective distribution station and the subscriber's receiving devices can be constructed using circuits of a conventional television receiver, resulting in low manufacturing costs.

The up-signals from the subscriber's transmitting devices may be transmitted to the center station by way of the selective distribution station without changing the shape of the signals halfway. In this case, the center station demodulates the up-signals, and then transmits its demodulated information to the selective distribution station. The number of demodulators for demodulating the up-signals can be reduced, as compared with the case where the up-signals are demodulated in the selective distribution station.

The function of a portable telephone terminal may also be added to the subscriber's transmitting devices, and the function of a portable telephone radio base station capable of transmitting and receiving portable telephone signals may be added to the selective distribution station. Consequently, a portable telephone system can be constructed utilizing the CATV system. In this case, the up-signals related to the function of a portable telephone terminal from the subscriber's transmitting devices may be transmitted to the center station by way of the selective distribution station without changing the shape of the signals halfway in order to reduce the number of demodulators for demodulating the up-signals. In addition, a plurality of selective distribution stations and the center station may be connected to each other by a transmission line in a tree shape or a bus shape arrangement. In this case, the up-signals from the subscriber's transmitting devices are transmitted to the center station through the transmission line after going through the selective distribution station. Further, the selective distribution station may also transmit response signals respectively corresponding to the up-signals from the subscriber's transmitting devices to the subscriber's receiving devices in the shape of an image signal, a character signal, or a voice signal. In this case, the response signals may be transmitted by radio signals.

The center station may be constructed so as to function as at least one of the selective distribution stations. In addition, the subscriber's transmitting devices may be constructed so that it can transmit the up-signals corresponding to the plurality of subscriber's receiving devices.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

(1) FIRST EMBODIMENT

Figure 1:
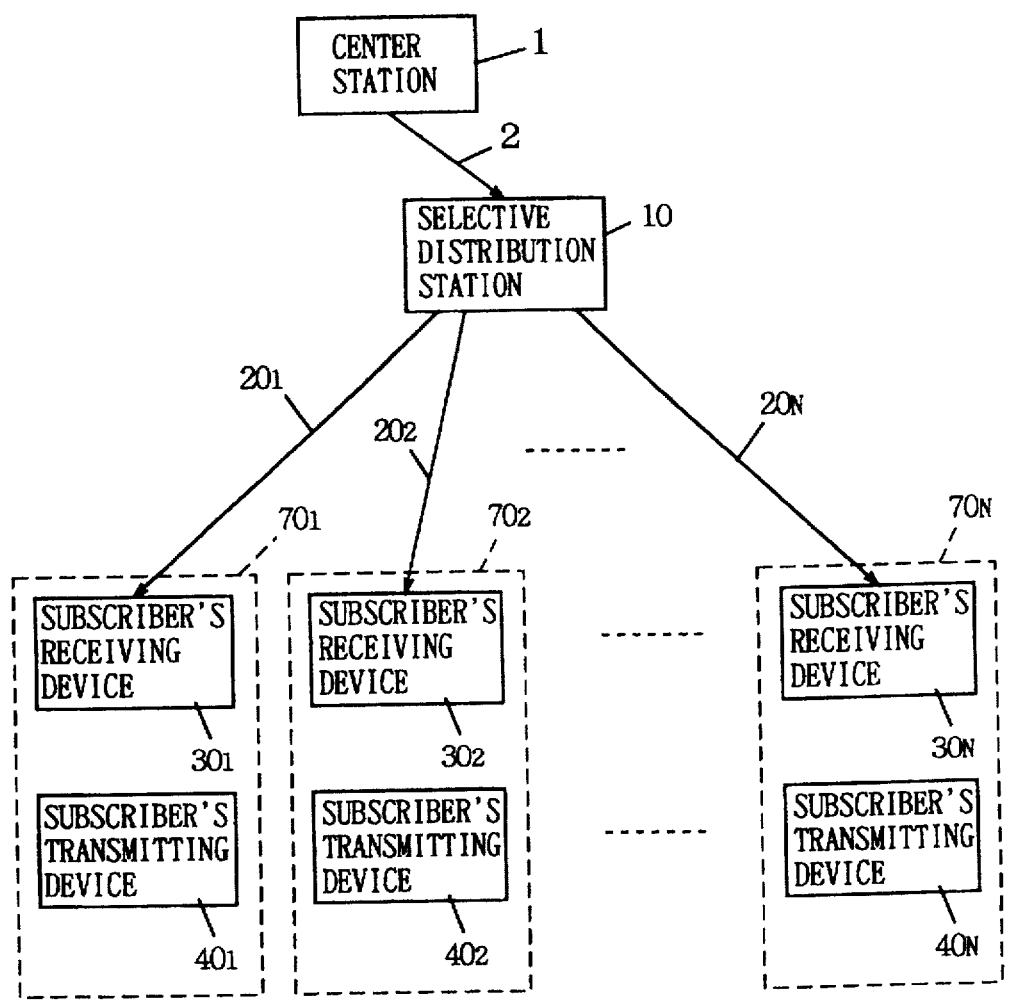
FIG. 1 is a block diagram showing the construction of a CATV system according to a first embodiment of the present invention.

FIG. 1 is a block diagram showing the construction of a CATV system according to a first embodiment of the present invention. In FIG. 1, the CATV system comprises a center station 1, a selective distribution station 10 connected to the center station 1, and N subscriber's devices $70_1$ to $70_N$ connected to the selective distribution station 10 in a star shaped arrangement. The subscriber's devices $70_1$ to $70_N$ respectively comprise subscriber's receiving devices $30_1$ to $30_N$ and subscriber's transmitting devices $40_1$ to $40_N$. An all-channel signal 2 obtained by frequency-division multiplexing signals on all channels is transmitted to the selective distribution station 10 from the center station 1. The selective distribution station 10 selectively distributes the all-channel signal 2, and transmits the signal respectively to the subscriber's devices $70_1$ to $70_N$ through transmission lines $20_1$ to $20_N$.

Described next is the operation of the CATV system according to the first embodiment constructed as described above.

For example, if it is desired to receive a signal on a certain channel by the subscriber's device $70_1$, a subscriber operates the subscriber's transmitting device $40_1$. Correspondingly, the subscriber's transmitting device $40_1$ transmits an up-signal for requesting a channel to be received to the selective distribution station 10 by a radio signal. When the selective distribution station 10 receives the up-signal from the subscriber's transmitting device $40_1$, it selects the signal on the channel to be transmitted to the subscriber's device $70_1$ from the all-channel signal 2, and transmits the selected signal of the channel to the transmission line $20_1$ in a suitable signal shape. Consequently, the subscriber's receiving device $30_1$ receives the signal transmitted from the selective distribution station 10. The subscriber's device $70_1$ thus receives only the selected signal of the channel. Consequently, it is possible to avoid the danger that subscription broadcasting is being tapped. If the subscriber's transmitting device $40_1$ can be operated as a remote controller separated from the subscriber's receiving device $30_1$, the subscriber can select the channel as if he or she operated a remote controller of a television receiver which is the subscriber's receiving device $30_1$.

Although the discussion above was made of the operation of the CATV system in the case of the subscriber's device $70_1$, the operation of the CATV system in the case of the other subscriber's devices is entirely the same as the foregoing operation.

The increase in the number of subject channels which can be selected by the subscriber results in an improvement in service. In the first embodiment described above, the number of subject channels can be increased without changing the transmission capacity of the transmission line between the selective distribution station 10 and each of the subscriber's devices $70_1$ to $70_N$. The reason for this is that the number of channels on the all-channel signal 2 may be increased in order to increase the number of channels which can be selected. Specifically, the entire transmission capacity from the center station 1 to each of the subscriber's devices need not be increased, provided that the transmission capacity between the center station 1 and the selective distribution station 10 can be ensured. When the CATV system is constructed, a wide-band transmission line is required between the center station 1 and the selective distribution station 10 according to the construction of the first embodiment. However, a very large transmission capacity is not required for the transmission line between the selective distribution station 10 and each of the subscriber's devices $70_1$ to $70_N$ which occupies a large part of the CATV system, thereby making it possible to reduce the overall system cost.

Furthermore, if the CATV system is constructed as a system for receiving, in the selective distribution station 10, the radio signal from each of the subscriber's transmitting devices $40_1$ to $40_N$, an area of which the selective distribution station 10 is in charge is reduced, the frequency utilization efficiency is increased, and the range of the area for which the selective distribution station 10 is in charge is clarified. On the other hand, if the CATV system is constructed as a system for collectively processing, in the center station, the up-signals in the entire CATV system, it is considered that the transmission capacity of the transmission line is insufficient in terms of the frequency utilization efficiency. In addition, there is the possibility that the CATV system cannot provide flexibility to deal with increase in the number of subscribers, for example. In this aspect, the number of subscriber's devices in the present embodiment is easily increased, thereby making it possible to allow flexibility to account for the increase in the number of subscribers.

(2) SECOND EMBODIMENT

Figure 2:
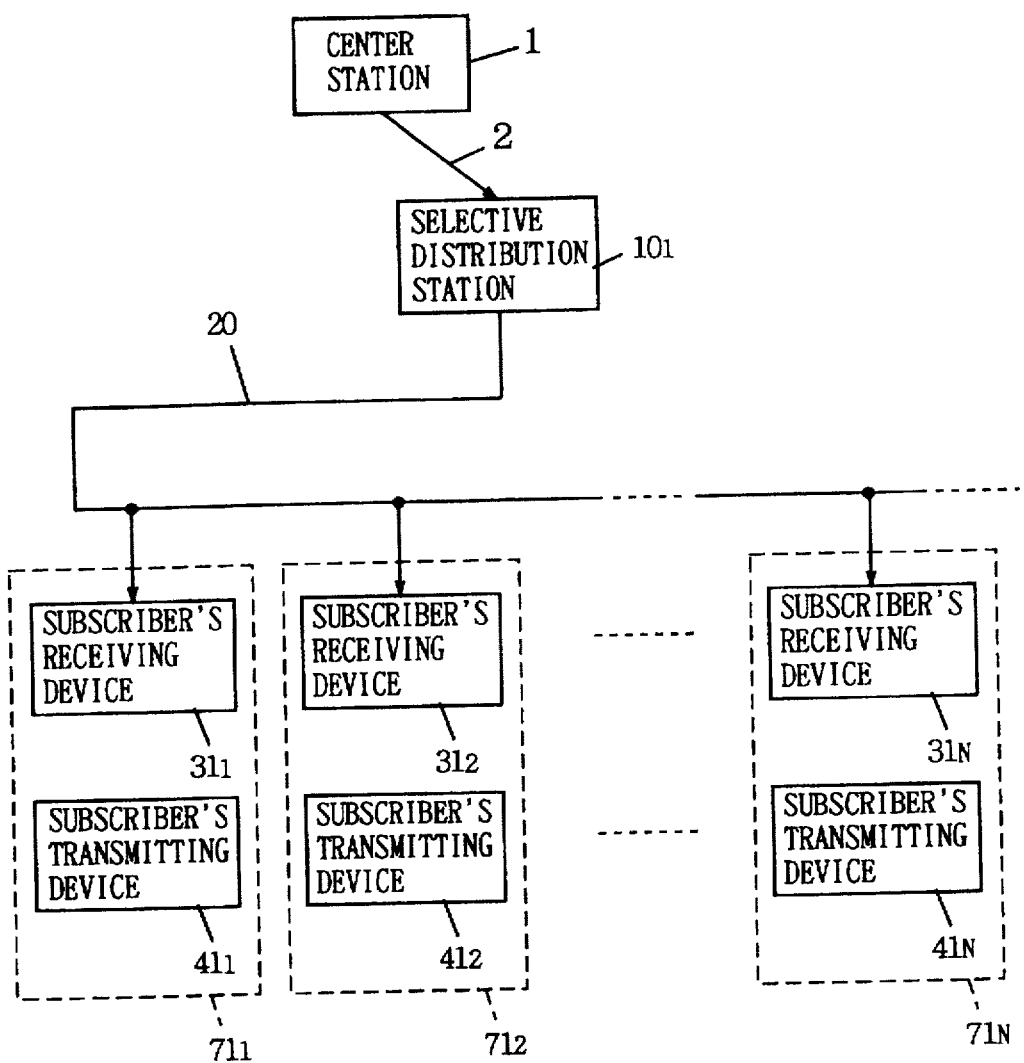
FIG. 2 is a block diagram showing the construction of a CATV system according to a second embodiment of the present invention.

FIG. 2 is a block diagram showing the construction of a CATV system according to a second embodiment of the present invention. In FIG. 2, the CATV system comprises a center station 1, a selective distribution station $10_1$ connected to the center station 1, and N subscriber's devices $71_1$ to $71_N$ connected to the selective distribution station 10 in a bus shape arrangement. The subscriber's devices $71_1$ to $71_N$ respectively comprise subscriber's receiving devices $31_1$ to $31_N$ and subscriber's transmitting devices $41_1$ to $41_N$. An all-channel signal 2 obtained by frequency-division multiplexing signals on all channels is transmitted to the selective distribution station $10_1$ from the center station 1. The selective distribution station 101 selectively distributes the all-channel signal 2, and transmits the signal to the subscriber's devices $71_1$ to $71_N$ through a transmission line 20.

Figure 3:
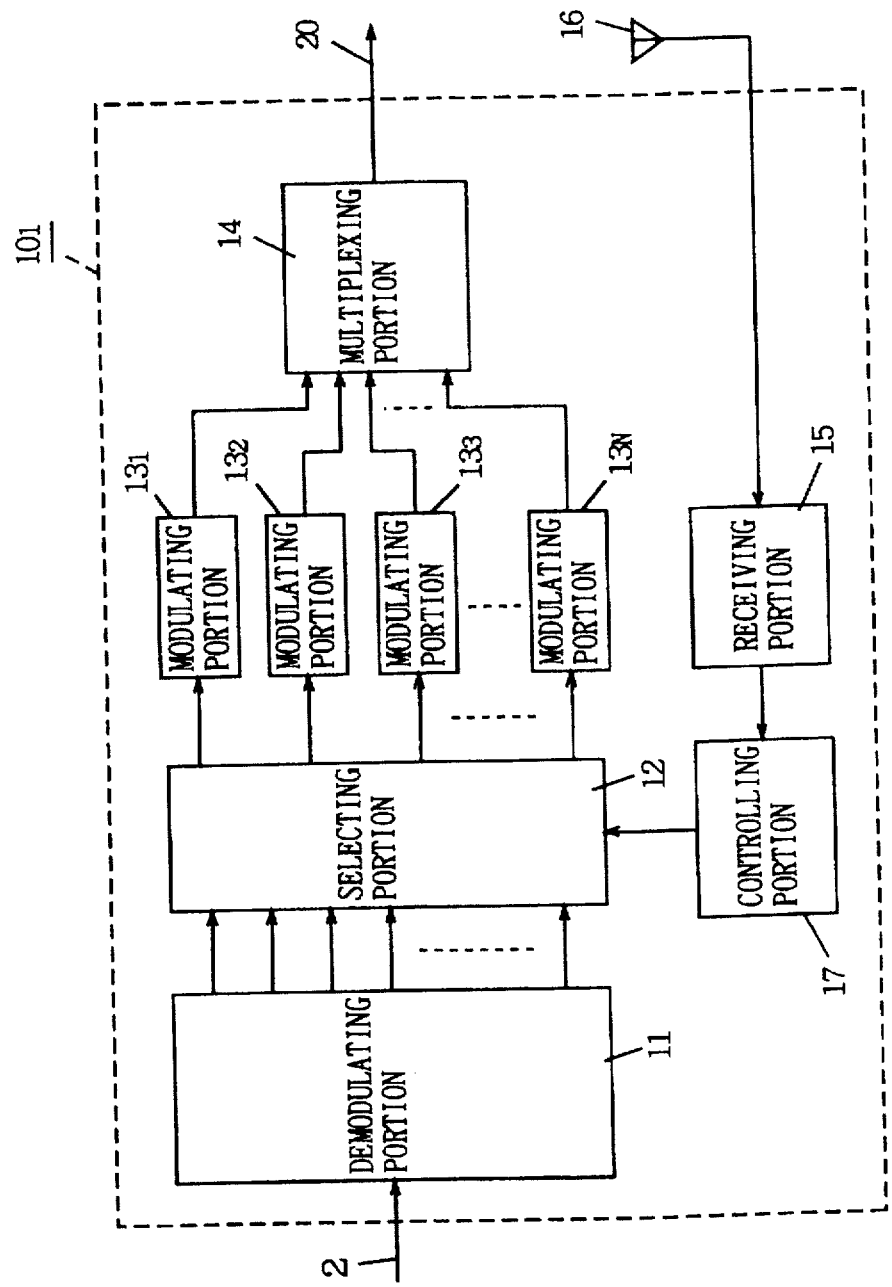
FIG. 3 is a block diagram showing a detailed construction of a selective distribution station in the second embodiment of the present invention.

FIG. 3 is a block diagram showing, in greater detail, the construction of the selective distribution station 10, shown in FIG. 2. In FIG. 3, the selective distribution station $10_1$ comprises a demodulating portion 11, a selecting portion 12, N modulating portions $13_1$ to $13_N$, a multiplexing portion 14, a receiving portion 15, an antenna 16, and a controlling portion 17. The demodulating portion 11 multiplexes and decomposes the all-channel signal 2 from the center station 1 and demodulates the signal into a plurality of signals on respective channels. The shape of output signals of the demodulating portion 11 reflects a baseband, AM (Amplitude Modulation), FM (Frequency Modulation), PCM (Pulse Code Modulation) or the like. The selecting portion 12 selects signals on N channels by allowing overlapping from the outputs of the demodulating portion 11. The modulating portions $13_1$ to $13_N$ respectively modulates signals selected to be transmitted to the subscriber's devices $71_1$ to $71_N$ in order to frequency-division multiplex the signals. In addition, the modulating portions $13_1$ to $13_N$ also convert the shape of the signals if the shape of the output signals of the selecting portion 12 and the shape of the signals which can be received by the subscriber's devices $71_1$ to $71_N$ differ from each other. For example, if inputs of the modulating portions $13_1$ to $13_N$ are PCM signals and outputs thereof are AM-VSB signals, input signals are converted into analog signals by digital-to-analog conversion, and are then converted into AM-VSB signals. The multiplexing portion 14 frequency-division multiplexes the outputs of the modulating portions $13_1$ to $13_N$ and provides the outputs to the transmission line 20. The receiving portion 15 receives up-signals from the subscriber's transmitting devices 41, to 41, induced on the antenna 16. The controlling portion 17 controls the connection between inputs and outputs in the selecting portion 12 such that the signals on the channels which subscribers respectively request to receive can be transmitted to the subscriber's devices $71_1$ to $71_N$.

Figure 4:
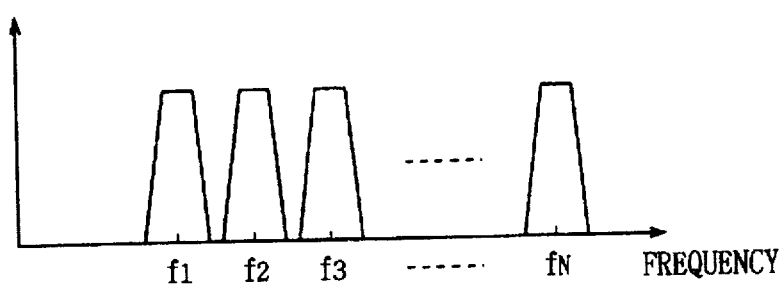
FIG. 4 is a diagram showing a frequency spectrum of signals on a transmission line of the second embodiment of the present invention.

FIG. 4 is a diagram showing a frequency spectrum of signals on the transmission line 20 shown in FIG. 2. In FIG. 4, $f_1$ to $f_N$ indicate the frequencies for down-signals (from the selective distribution station to the subscriber's receiving devices) which are respectively assigned to the subscriber's receiving devices $31_1$ to $31_N$. It is essential that the signals are frequency-division multiplexed. The particular method use to modulate the signal having each frequency is not limited. The modulating portions $13_1$ to $13_N$ output the predetermined modulated signals in the frequency bands $f_1$ to $f_N$ respectively. On the other hand, each of the subscriber's receiving devices $31_1$ to $31_N$ receives only the signal in the frequency band assigned to itself.

Described next is the operation of the CATV system according to the second embodiment constructed as described above.

For example, if it is desired to receive a signal on a certain channel by the subscriber's device $71_1$, the subscriber's transmitting device $41_1$ transmits an up-signal for requesting the signal to the selective distribution station $10_1$ by a radio signal. In the selective distribution station $10_1$, the receiving portion 15 receives the up-signal from the subscriber's transmitting device 41, through the antenna 16, and transmits information to the controlling portion 17. The controlling portion 17 controls the selecting portion 12 on the basis of the transmitted up-signal. The selecting portion 12 selects the signal on the channel which the subscriber's device $71_1$ requests to receive from the demodulated all-channel signal when it receives a control signal from the controlling portion 17, and outputs the selected signal to the modulating portion $13_1$. The modulating portion $13_1$ modulates the signal on the channel which the subscriber's device $71_1$ requests to receive using the frequency $f_1$ assigned to the subscriber's receiving device $31_1$. An output of the modulating portion $13_1$, along with outputs of the other modulating portions $13_2$ to $13_N$, is frequency-division multiplexed in the multiplexing portion 14, and is transmitted to the transmission line 20 as a down-signal. The subscriber's receiving device $31_1$ receives the down-signal on the transmission line 20 by the frequency $f_1$ assigned to itself. The subscriber's device $71_1$ thus receives only the selected signal on the channel. Consequently, it is possible to avoid the danger that subscription broadcasting is being tapped.

Although description was made of the operation of the CATV system by describing the subscriber's device $71_1$, the operation of the CATV system in the case of the other subscriber's devices is entirely the same as the foregoing operation.

As described in the foregoing, according to the second embodiment, the down-signals which are information signals transmitted from the selective distribution station $10_1$ to the respective subscriber's devices $71_1$ to $71_N$ are frequency-division multiplexed, whereby the selective distribution station 10, and all of the subscriber's devices $71_1$ to $71_N$ connected thereto can be connected to each other by one transmission line 20, thereby making it possible to reduce the overall length of the transmission line. In addition, only one transmitter is required on the side of the selective distribution station $10_1$. Since one transmission line is connected to the selective distribution station $10_1$, the physical dimensions of an outlet for a transmission line in the selective distribution station $10_1$ may be made small. This is advantageous in terms of miniaturization of the selective distribution station $10_1$. Since frequency-division multiplexing is employed, it is feasible to add additional subscriber's devices if there is room in the frequency bands, and the position where the subscriber's device is connected to the transmission line is not also already utilized. Moreover, if a CATV system using a coaxial cable in the present condition is considered, a network structure using a coaxial tap-off of a subscriber system can be used without requiring any modification.

Although in the above described second embodiment, description was made assuming that only a signal selected in correspondence with a request for receiving is transmitted to each of the subscriber's devices $71_1$ to $71_N$ from the selective distributing station $10_1$, there is always a signal transmitted unconditionally to each of subscribers as a basic service channel. However, the signal on the basic service channel does not conflict with the system for transmitting signals that are subjected to frequency-division multiplexing as in the present embodiment. If a frequency band is assigned for each subscriber's device, the signal can be transmitted to the subscriber's device without changing the basic structure. The same is true for the other embodiments if a system for transmitting signals to subscriber's devices in frequency-division multiplexing is employed.

(3) THIRD EMBODIMENT

Figure 5:
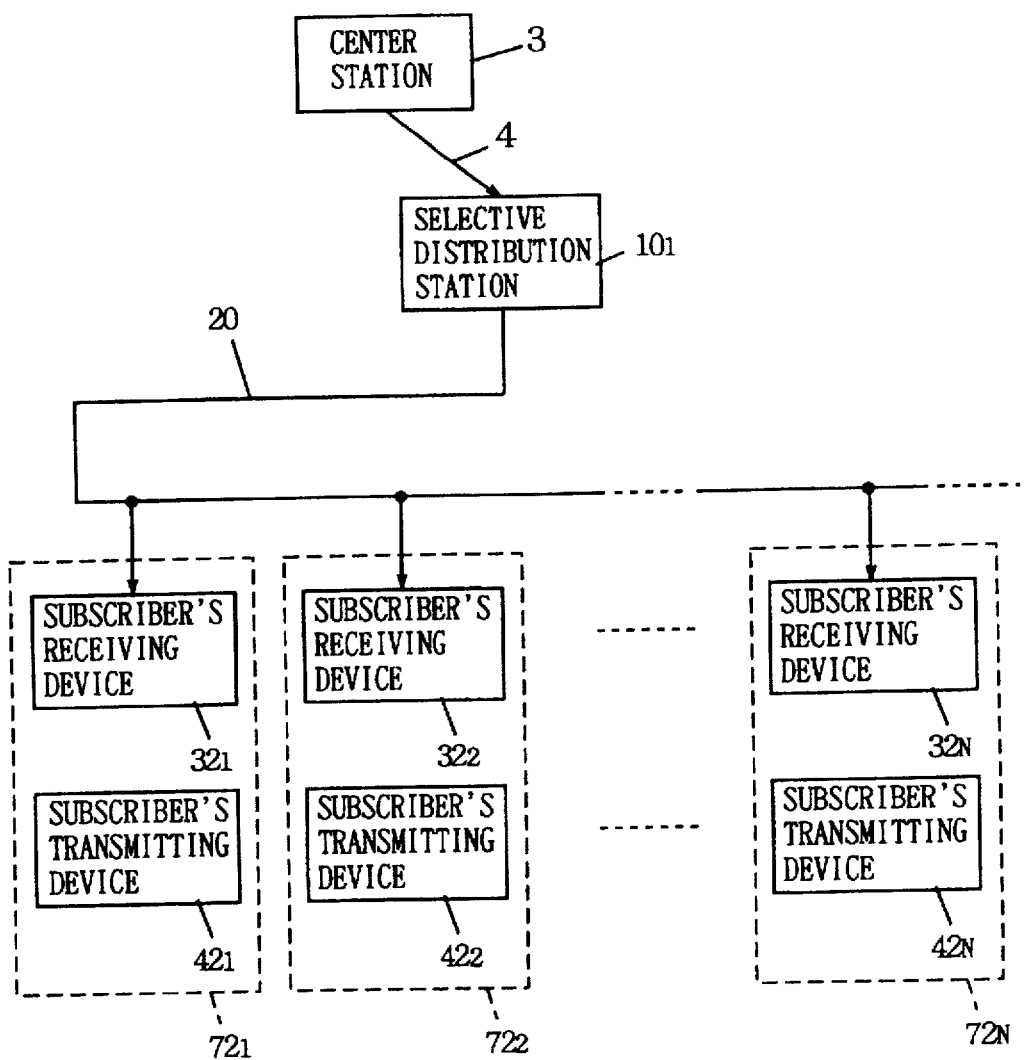
FIG. 5 is a block diagram showing the construction of a CATV system according to a third embodiment of the present invention.

FIG. 5 is a block diagram showing the construction of a CATV system according to a third embodiment of the present invention. In FIG. 5, the CATV system comprises a center station 3, a selective distribution station $10_2$ connected to the center station 3, and N subscriber's devices $72_1$ to $72_N$ connected to the selective distribution station $10_2$ in a bus shape arrangement. The subscriber's devices $72_1$ to $72_N$ respectively comprise the subscriber's receiving devices $32_1$ to $32_N$ and subscriber's transmitting devices $42_1$ to $42_N$.

Figure 6:
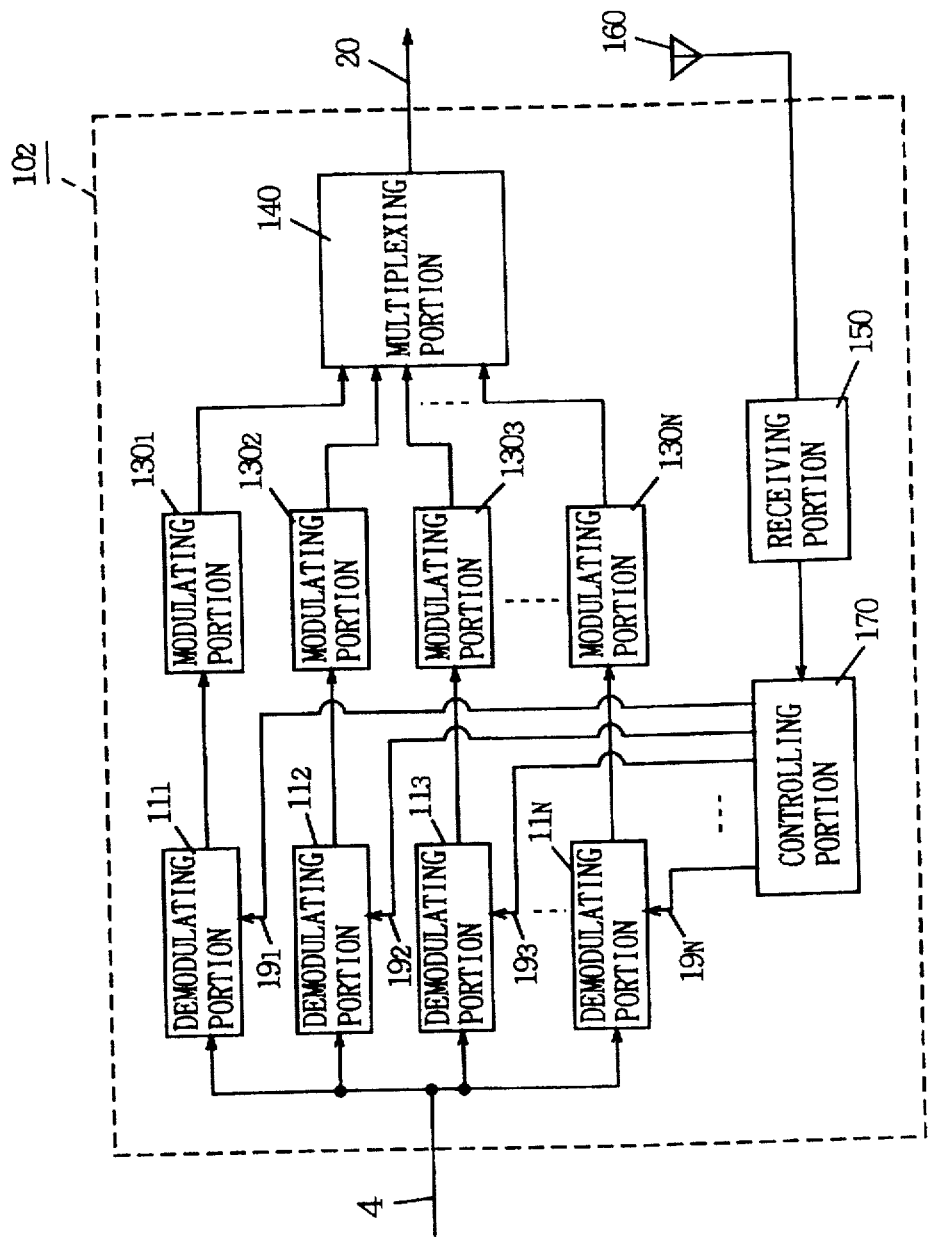
FIG. 6 is a block diagram showing a detailed construction of a selective distribution station in the third embodiment of the present invention.

FIG. 6 is a block diagram showing, in greater detail, the construction of the selective distribution station 102 shown in FIG. 5. In FIG. 6, the selective distribution station 102 comprises N demodulating portions $11_1$ to $11_N$, N modulating portions $130_1$ to $130_N$, a multiplexing portion 140, a receiving portion 150, an antenna 160, and a controlling portion 170. The demodulating portions $11_1$ to $11_N$ tune and extract signals on respective channels designated from an FDM signal 4 and then demodulates the signals. The shape of output signals of the demodulating portions $11_1$ to $11_N$ is the shape of a baseband signal or an intermediate frequency signal. The modulating portions $130_1$ to $130_N$ modulate signals which are selected to be transmitted to the respective subscriber's devices $72_1$ to $72_N$, that is, outputs of the demodulating portions $11_1$ to $11_N$ in order, to frequency-division multiplex the outputs. In addition, the modulating portions $130_1$ to $130_N$ convert the shape of signals if the shape of the output signals of the demodulating portions $11_1$ to $11_N$ and the shape of the signals which can be received by the subscriber's devices $72_1$ to $72_N$ differ from each other. The multiplexing portion 140 frequency-division multiplexes outputs of the modulating portions $130_1$ to $130_N$ and provides the outputs to the transmission line 20. The receiving portion 150 receives up-signals from the subscriber's transmitting devices $42_1$ to $42_N$ through the antenna 160. The controlling portion 170 controls the tuned states of the demodulating portions $11_1$ to $11_N$ such that the signals on the channels which subscribers respectively request to receive can be transmitted to the subscriber's devices $72_1$ to $72_N$ on the basis of the up-signals fed from the receiving portion 150. Control signals $19_1$ to $19_N$ outputted from the controlling portion 170 are respectively fed to the demodulating portions $11_1$ to $11_N$.

In the above described third embodiment, the frequency spectrum of signals on the transmission line 20 is the same as the schematic diagram for the frequency spectrum in the second embodiment (see FIG. 4). Specifically, $f_1$ to $f_N$ indicates frequencies for down-signals (from the selective distribution station to the subscriber's receiving devices) which are respectively assigned to the subscriber's receiving devices $32_1$ to $32_N$. It is essential that the signals are frequency-division multiplexed. The particular method use to modulate the signal having each frequency is not limited. The modulating portions $130_1$ to $130_N$ output modulated signals in frequency bands respectively assigned thereto. On the other hand, each of the subscriber's receiving devices $32_1$ to $32_N$ receives only the signal in the frequency band assigned to itself.

Described next is the operation of the CATV system according to the third embodiment constructed as described above.

For example, if it is desired to receive a signal on a certain channel by the subscriber's device $72_1$, the subscriber's transmitting device $42_1$ transmits an up-signal for requesting the signal to the selective distribution station $10_2$ by a radio signal. In the selective distribution station $10_2$, the receiving portion 150 receives the up-signal from the subscriber's transmitting device $42_1$ through the antenna 160, and transmits information to the controlling portion 170. The controlling portion 170 sends the control signal $19_1$ to the demodulating portion $11_1$ on the basis of the information transmitted from the receiving portion 150, to control the demodulating portion $11_1$. When the demodulating portion $11_1$ receives the control signal $19_1$ from the controlling portion 170, it tunes and demodulates the signal on the channel which the subscriber's device $72_1$ requests to receive from the FDM signal 4, and outputs the signal to the modulating portion $130_1$ in the shape of a baseband signal or an intermediate frequency signal. The modulating portion $130_1$ modulates the signal on the channel which the subscriber's device $72_1$ requests to receive the signal using the frequency $f_1$ assigned to the subscriber's device $72_1$. An output of the modulating portion $130_1$, along with outputs of the other modulating portions $130_2$ to $130_N$, are frequency-division multiplexed in the multiplexing portion 140, and are transmitted to the transmission line 20 as down-signals. The subscriber's receiving device $32_1$ receives the above described down-signal from the transmission line 20 by the frequency $f_1$ assigned to itself. The subscriber's device $72_1$ thus receives only the selected signal on the channel. Consequently, it is possible to avoid the danger that subscription broadcasting is being tapped.

Although the above description was of the operation of the CATV system in the case of the subscriber's device $72_1$, the operation of the CATV system in the case of the other subscriber's devices is entirely the same as the foregoing operation.

As described in the foregoing, the third embodiment is constructed such that the signal on the desired channel is demodulated once from the FDM signal and is then modulated in the selective distribution station $10_2$, thereby making it possible to change modulation systems in input and output signals of the selective distribution station $10_2$. Consequently, combinations of AM, FM, FSK (Frequency-Shift Keying), PSK (Phase-Shift Keying) and the like can be realized. As a result, if the input and output signals are general AM-FDM signals, a television tuner and a television modulator can be respectively used as a demodulating portion and a modulating portion, thereby making it possible to realize a selective distribution station having a low cost.

This is particularly the case if frequency bands for television broadcasting signals are employed as frequency bands for down-signals, thereby allowing the use of a television receiver commercially available to be used as a subscriber's receiving device without any modification.

(4) FOURTH EMBODIMENT

Figure 7:
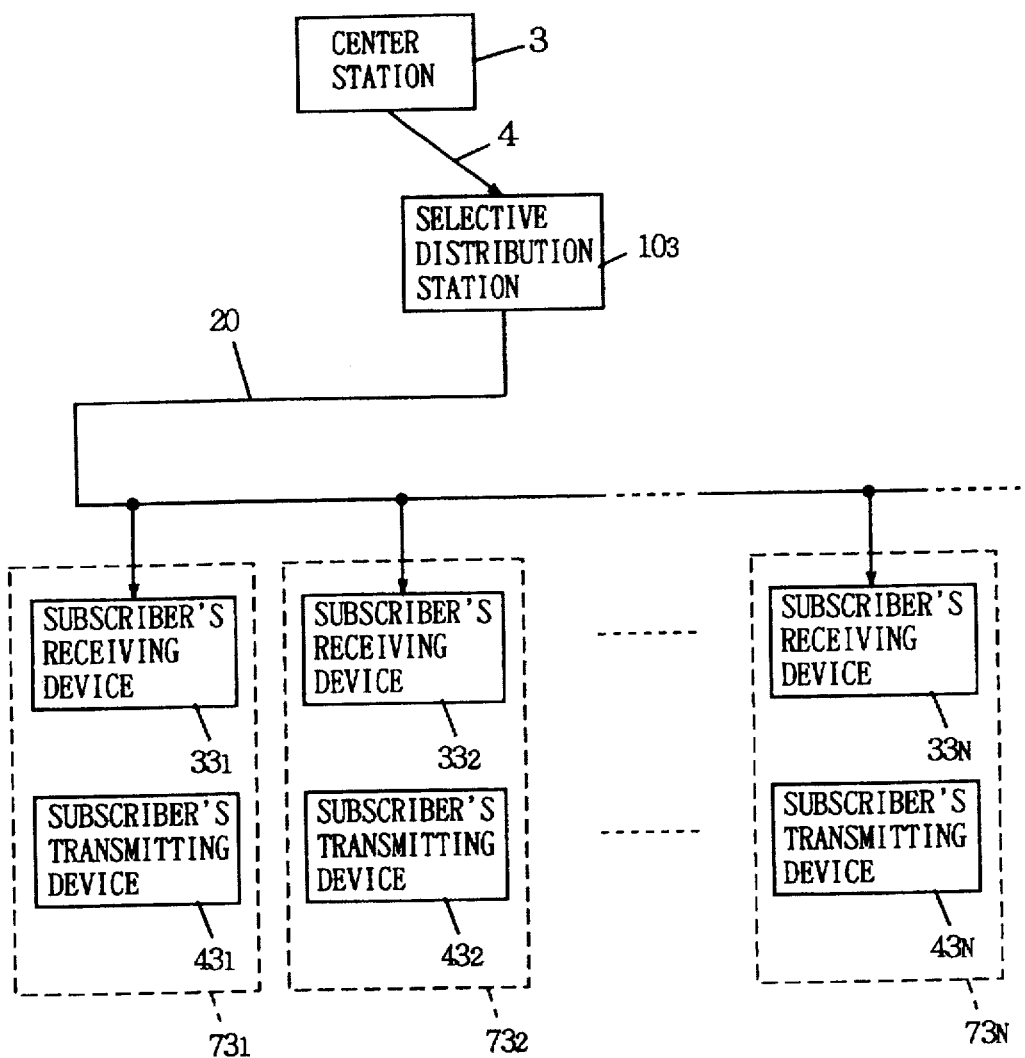
FIG. 7 is a block diagram showing the construction of a CATV system according to a fourth embodiment of the present invention.

FIG. 7 is a block diagram showing the construction of a CATV system according to a fourth embodiment of the present invention. In FIG. 7, the CATV system comprises a center station 3, a selective distribution station $10_3$ connected to the center station 3, and N subscriber's devices $73_1$ to $73_N$ connected to the selective distribution station $10_3$ in a bus shape arrangement. The subscriber's devices $73_1$ to $73_N$ respectively comprise subscriber's receiving devices $33_1$ to $33_N$ and subscriber's transmitting devices $43_1$ to $43_N$.

Figure 8:
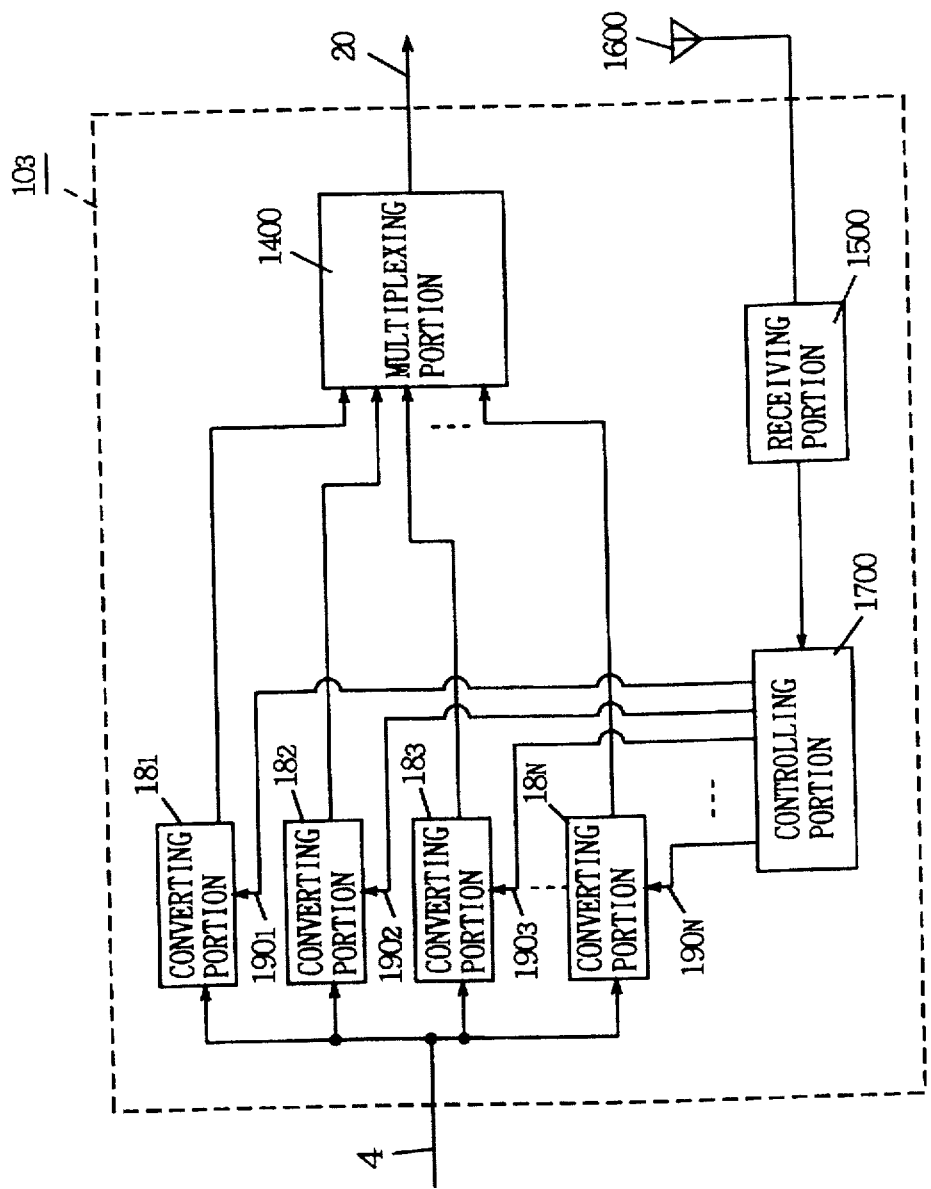
FIG. 8 is a block diagram showing a detailed construction of a selective distribution station in the fourth embodiment of the present invention.

FIG. 8 is a block diagram showing the construction of the selective distribution station $10_3$ shown in FIG. 7 in greater detail. In FIG. 8, the selective distribution station $10_3$ comprises N converting portions $18_1$ to $18_N$, a multiplexing portion 1400, a receiving portion 1500, an antenna 1600, and a controlling portion 1700. The converting portions $18_1$ to $18_N$ extract signals on respective channels designated from an FDM (frequency-division multiplex) signal 4, and frequency-convert the extracted signals into signals having frequencies respectively assigned. The multiplexing portion 1400 frequency-division multiplexes the outputs of the converting portions $18_1$ to $18_N$ and provides the outputs to the transmission line 20. The receiving portion 1500 receives up-signals from the subscriber's transmitting devices $43_1$ to $43_N$ through the antenna 1600. The controlling portion 1700 controls the converted states of the converting portions $18_1$ to $18_N$ such that the signals on the channels which subscribers respectively request to receive can be transmitted to the subscriber's devices $73_1$ to $73_N$. Control signals $190_1$ to $190_N$ which are outputted from the controlling portion 1700 are respectively fed to the converting portions $18_1$ to $18_N$.

In the above described fourth embodiment, the schematic frequency spectrum of signals on the transmission line 20 is the same as the frequency spectrum as discussed in the second embodiment (see FIG. 4). Specifically, $f_1$ to $f_N$ indicate frequencies for down-signals (from the selective distribution station to the subscriber's receiving devices) which are respectively assigned to the subscriber's receiving devices $33_1$ to $33_N$. It is essential that the signals are frequency-division multiplexed. The particular method used to modulate the signal having each frequency is not limited. The converting portions $18_1$ to $18_N$ output frequency-converted signals to frequency bands respectively assigned. On the other hand, each of the subscriber's receiving devices $33_1$ to $33_N$ receives only the signal in the frequency band assigned to itself.

Discussed next is the operation of the CATV system according to the fourth embodiment constructed as described above.

For example, if it is desired to receive a signal on a certain channel by the subscriber's receiving device $33_1$, the subscriber's transmitting device 43, transmits an up-signal for requesting the signal to the selective distribution station $10_3$ by a radio signal. In the selective distribution station $10_3$, the receiving portion 1500 receives the up-signal from the subscriber's transmitting device $43_1$ through the antenna 1600, and transmits information to the controlling portion 1700. The controlling portion 1700 sends the control signal $190_1$ to the converting portion $18_1$ on the basis of the information given from the receiving portion 1500, to control the converting portion $18_1$. When the converting portion $18_1$ receives the control signal $190_1$ from the controlling portion 170, it selectively tunes the signal on the channel which the subscriber's device $33_1$ requests to receive from the FDM signal 4, and converts the frequency of the signal into the frequency $f_1$ assigned to the subscriber's receiving device $33_1$. Specifically, a sine wave signal having a frequency representing the difference between the frequency of a signal on a desired channel and the frequency f, previously assigned is mixed with the FDM signal 4 by a mixer, and a signal is extracted by a band-pass filter set in the frequency $f_1$ from its mixture output, thereby attaining the above described frequency-converting function. The frequency-converting function is a so-called down-converting or up-converting function. In this case, the function of the controlling portion 1700 is to control the frequency of the sine wave. An output of the converting portion $18_1$, along with outputs of the converting portions $18_2$ to $18_N$, is frequency-division multiplexed in the multiplexing portion 1400, and is then transmitted to the transmission line 20 as a down-signal. The subscriber's receiving device $33_1$ receives the above described down-signal from the transmission line 20 by the frequency $f_1$ assigned to itself. The subscriber's receiving device $33_1$ and the subscriber's transmitting device $43_1$ thus receive only the selected signal on the channel. Consequently, it is possible to avoid the danger that subscription broadcasting is being tapped.

Although the above description was of the operation of the CATV system in the case of the subscriber's device $73_1$, the operation of the CATV system in the case the other subscriber's devices is entirely the same as the foregoing operation.

As described in the foregoing, according to the fourth embodiment, the construction of the CATV system is simplified because the frequencies of the signals are only converted in the selective distribution station $10_3$, and the signals are minimally degraded because complicated signal processing is not performed. This occurs on the assumption that modulation systems in input and output signals of the selective distribution station $10_3$ are the same.

In the above described first to fourth embodiments, the all-channel signal obtained by multiplexing the signals on all the channels is always transmitted to the selective distribution station from the center station in the CATV system, this arrangement, however, is not necessarily required. The reason for this is that at least the signal which the subscriber requests to receive may be sent to the selective distribution station from the center station.

If the all-channel signal is always transmitted to the selective distribution station from the center station, provided that the capacity of the transmission line from the center station to the selective distribution station is sufficient and the number of transmitted signals is independent of the transmission cost, communication control or the like is not required, thereby making it possible to reduce the cost to a minimum.

If it is desired to make the number of transmitted signals as small as possible so as to achieve optimum levels of the maintenance of the transmission performance and the transmission cost only the necessary minimal signals must be transmitted to the selective distribution station from the center station. In such a case, if there is a request for a channel to be received from the subscriber, the selective distribution station requests the center station to transmit the signal on the requested channel in response to the request, and the center station transmits the signal on the channel to the selective distribution station. This makes it possible to keep the number of signals transmitted to the selective distribution station from the center station to a minimum level.

Consider a case where the shape of transmitted signals between the center station and the selective distribution station is FDM (frequency-division multiplex). In this case, when a signal is added and transmitted, the center station may find a carrier wave which is not used, that is, an empty channel and add the signal thereto. Information as to which carrier wave is used and which signal is transmitted by the carrier wave must be shared between both the center station and the selective distribution station. In the case of this system, when the number of carrier waves is small, power per one carrier wave can be increased, whereby the signal can be transmitted in a state in which the signal is superior in quality.

Consider a case where the shape of transmitted signals between the center station and the selective distribution station is baseband digital signal. In this case, the transmission speed of the transmitted signals is constant irrespective of the amount of information in mere TDM (time-division multiplex), whereby there are few advantages even if the number of signals is reduced. If digital data is transmitted utilizing a public network, however, the transmission cost can, in some cases be reduced by reducing the number of signals. Also in this case, information as to the manner in which each signal is multiplexed must be shared between both the center station and the selective distribution station. If the signals are transmitted between the center station and the selective distribution station in a high-speed packet transmission system such as an ATM (asynchronous transfer mode) transmission system using a public network, the amount of transmission and the number of packets are proportional to each other. Therefore, the smaller the number of signals, the lower the transmission cost can be kept.

(5) FIFTH EMBODIMENT

Figure 9:
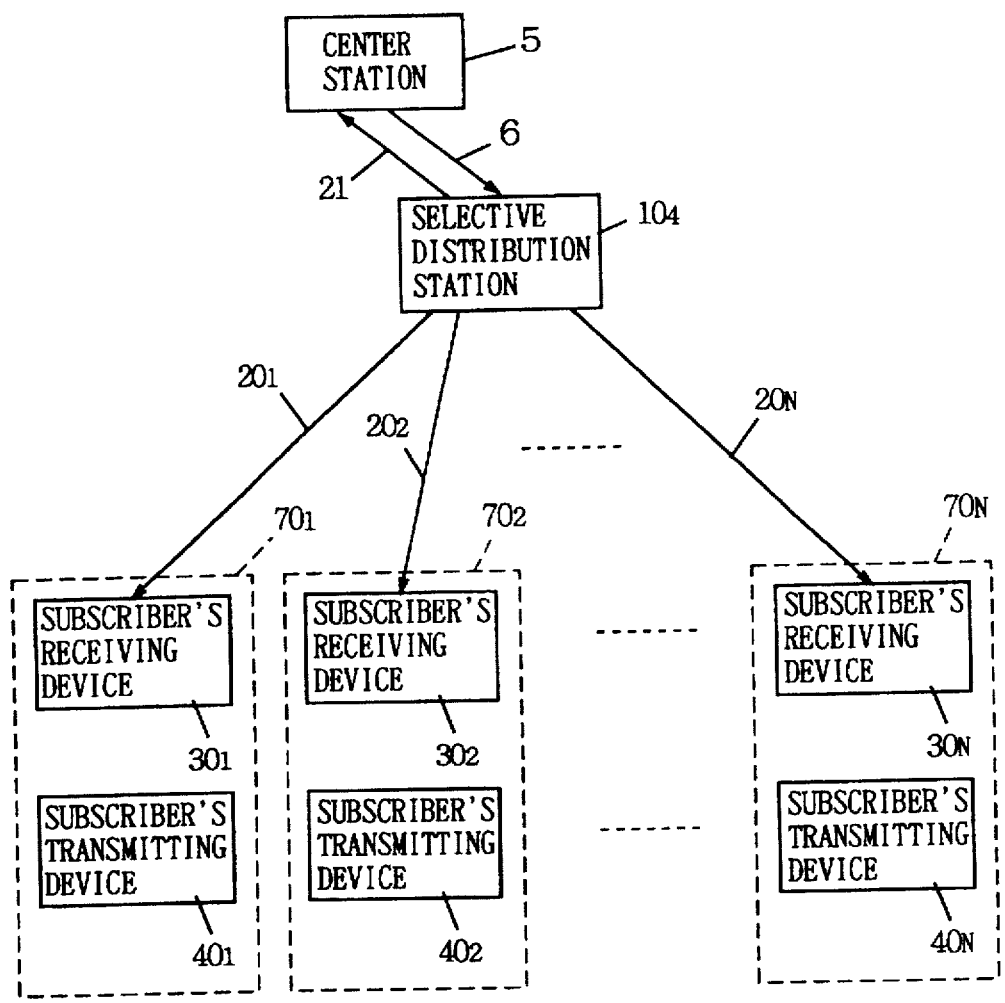
FIG. 9 is a block diagram showing the construction of a CATV system according to a fifth embodiment of the present invention.

FIG. 9 is a block diagram showing the construction of a CATV system according to a fifth embodiment of the present invention. In FIG. 9, the CATV system comprises a center station 5, a selective distribution station $10_4$ connected to the center station 5, and N subscriber's devices $70_1$ to $70_N$ connected to the selective distribution station $10_4$ in a star shape arrangement. The subscriber's devices $70_1$ to $70_N$ respectively comprise subscriber's receiving devices $30_1$ to $30_N$ and subscriber's transmitting devices $40_1$ to $40_N$. The CATV system in the present embodiment is the same as those in the other above described embodiments except that it transmits an up-signal from each of the subscriber's transmitting devices $40_1$ to $40_N$ to the center station 5 by way of the selective distribution station $10_4$ without changing the shape of the signal halfway, demodulates the signal in the center station 5, and then transmits its demodulation information from the center station 5 to the selective distribution station $10_4$. The structures of the subscriber's receiving devices $30_1$ to $30_N$ and the subscriber's transmitting devices $40_1$ to $40_N$ shall be the same as those in the first embodiment for convenience. Consequently, the transmission between the selective distribution station $10_4$ and subscribers, receiving devices $30_1$ to $30_N$ is not described herein.

Described next is the operation of the CATV system according to the fifth embodiment constructed as described above.

For example, if it is desired to receive a signal on a certain channel by the subscriber's device $70_1$, the subscriber's transmitting device $40_1$ transmits an up-signal for requesting the signal to the selective distribution station $10_4$ by a radio signal. The selective distribution station $10_4$ does not demodulate the up-signal received through an antenna, but rather transmits the up-signal to the center station 5 by wire or radio transmission without changing the shape of the received signal. In the case of the wire transmission, the received signal is transmitted to the center station 5 by way of an up-transmission line 21. In the case of the radio transmission, the carrier frequency must, in some cases, be converted. On the other hand, in the case of the radio transmission, a particular up-transmission line 21 need not be provided. When the center station 5 receives the up-signal from the subscriber's transmitting device $30_1$, it demodulates the up-signal, and transmits its demodulation information to the selective distribution station $10_4$ as a part of down signals 6. In the case of a system for transmitting only signals on requested channels to the selective distribution station from the center station, the center station 5 also transmits a signal on a channel corresponding to a request for receiving to the selective distribution station $10_4$. The selective distribution station $10_4$ selects the signal on the channel corresponding to the request for receiving out of the down-signals 6 on the basis of the demodulation information from the center station 5, and transmits the selected signal to the subscriber's receiving device $30_1$.

Although description was made of the operation of the CATV system in the case of the subscriber's device $70_1$, the operation of the CATV system in the case of the other subscriber's devices is entirely the same as the foregoing operation.

As described in the foregoing, according to the fifth embodiment, demodulators for demodulating the up-signals from the subscriber's devices $70_1$ to $70_N$ need not be provided in the selective distribution station $10_4$, thereby making it possible to miniaturize the selective distribution station. In addition, the demodulating function is concentrated on the center station 5, thereby making it possible to reduce the total number of demodulators. Specifically, if the CATV system is considered as a whole, all the subscriber's transmitting devices do not simultaneously transmit the up-signals. Accordingly, the CATV system does not require a number of demodulators which corresponds to the number of subscriber's transmitting devices, and may have a number of demodulators corresponding to the traffic volume. The larger the number of subscriber's transmitting devices are, the smaller the number of demodulators corresponding to the total number of subscriber's transmitting devices. Consequently, the total number of demodulators can be reduced in a case where the demodulators are collectively provided in the center station, as compared with a case where the demodulators are respectively arranged in the selective distribution stations in a distributed manner.

Figure 10:
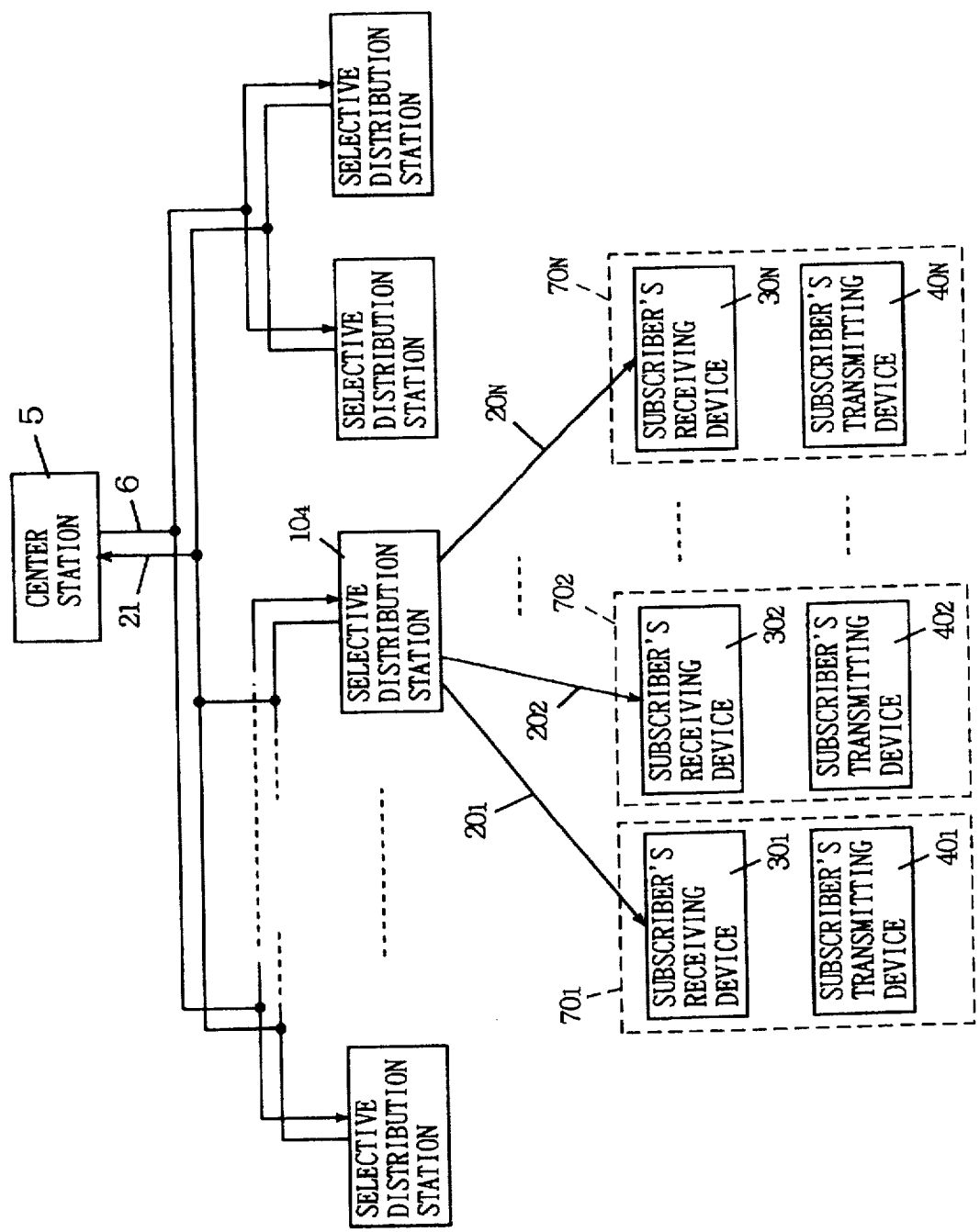
FIG. 10 is a block diagram showing the construction of the CATV system of the fifth embodiment of the present invention in which a center station and selective distribution stations are connected to each other by a transmission line in a tree shape arrangement.
Figure 11:
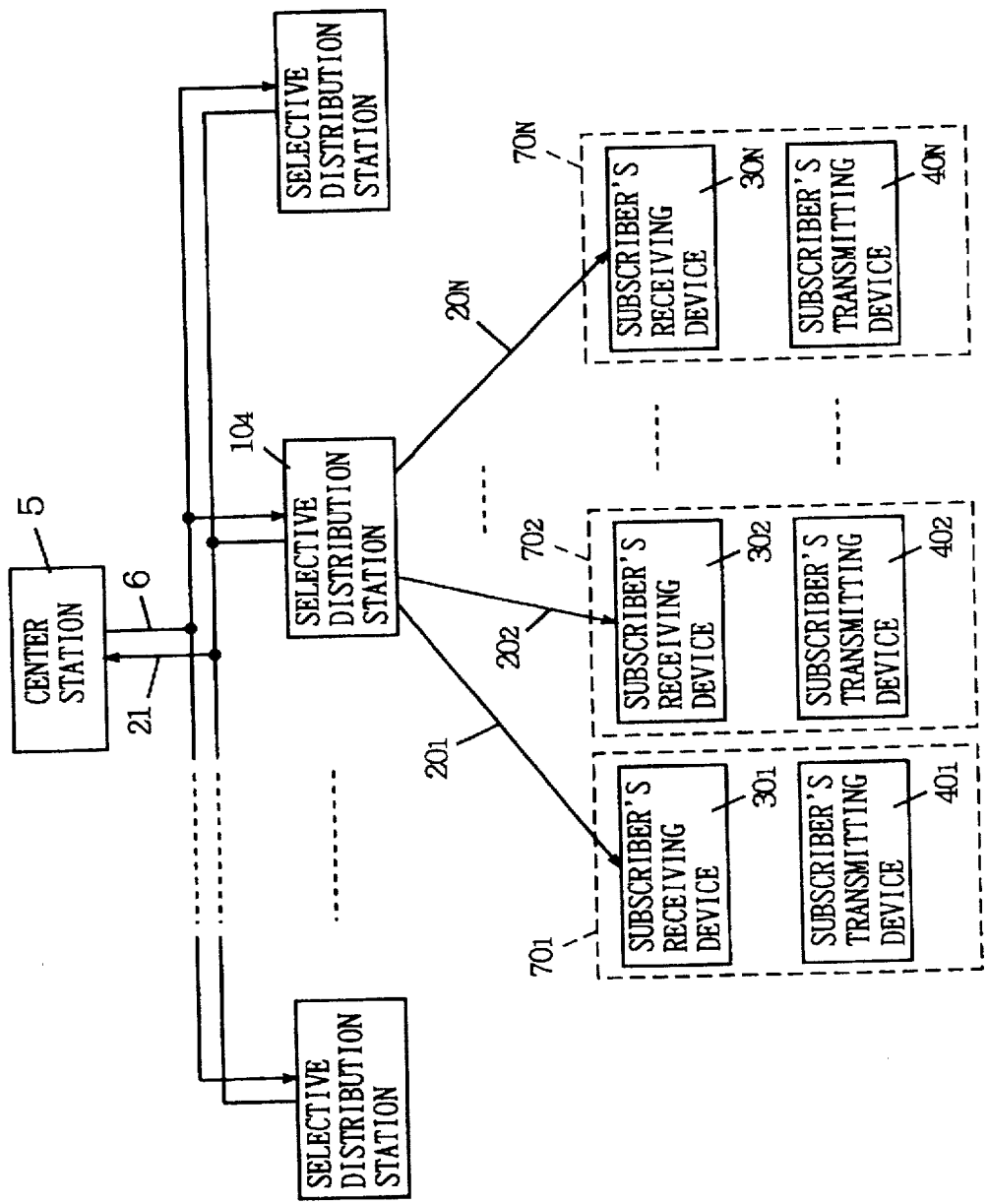
FIG. 11 is a block diagram showing the construction of the CATV system of the fifth embodiment of the present invention in which a center station and selective distribution stations are connected to each other by a transmission line in a bus shape arrangement.
Figure 12:
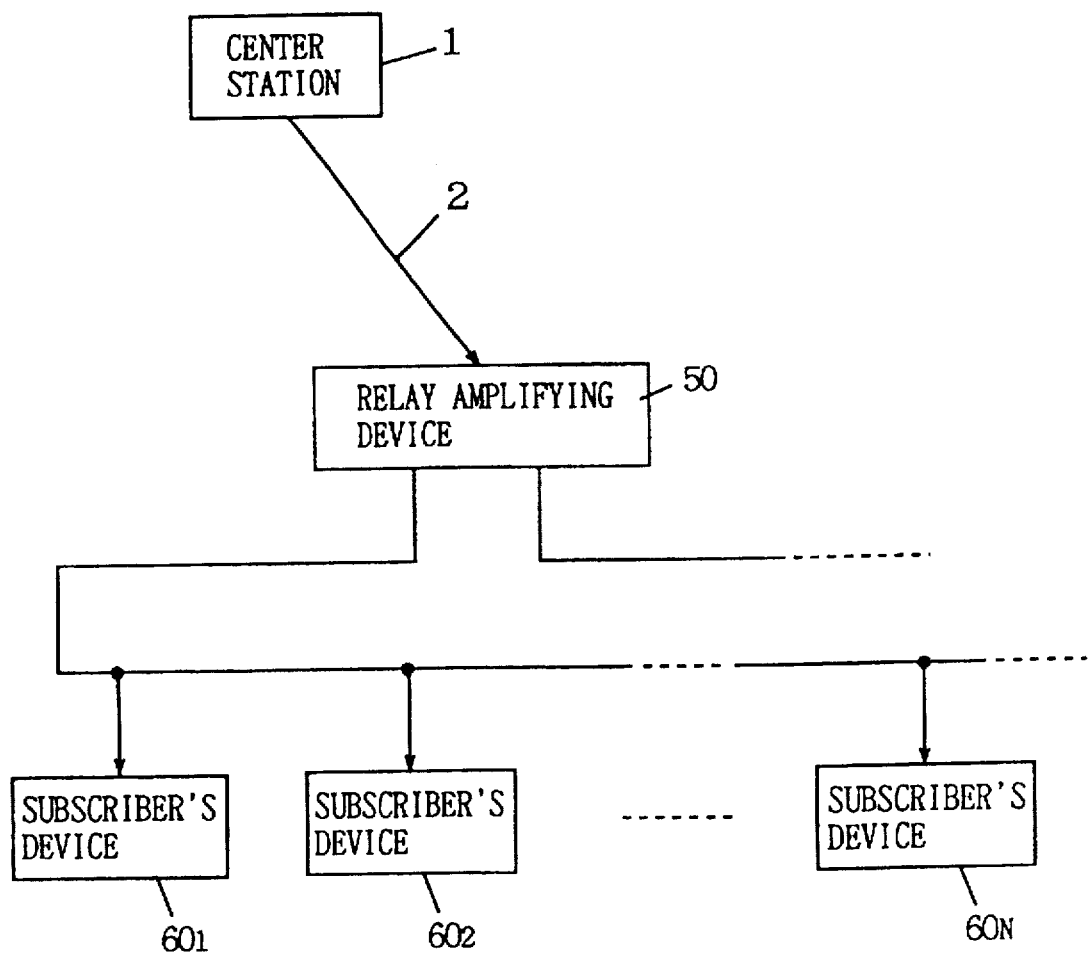
FIG. 12 is a block diagram showing the construction of a conventional CATV system.

As the transmission line 21, a coaxial cable, an optical fiber or the like can be used. If transmission loss is a problem or a wide band is required, however, transmission using the optical fiber is most suitable. If selective distribution stations are connected to a center station in a tree shape or a bus shape arrangement, as shown in FIGS. 10 and 11, the length of the optical fiber of the overall system can be reduced, and the number of light receiving portions in the center station can be reduced, as compared with a case where the connection is made in a star shape arrangement. Moreover, funneled noise is eliminated which is a problem when the selective distribution station is connected to the center station by the coaxial cable. This is also true for a case where portable telephone signals are transmitted to the center station by way of the selective distribution station as described below.

If the CATV system is constructed such that the subscriber's transmitting devices have the function of a portable telephone terminal, and the selective distribution station has the function of a portable telephone radio base station for transmitting and receiving portable telephone signals, and the CATV system can be connected to a public communication network by way of the center station or directly from the selective distribution station, a portable telephone system can be constructed by the CATV system as its sub-system.

Although an up-signal for CATV serving as a request for receiving and the like from the subscriber's transmitting device and a signal for a portable telephone must be naturally distinguished, methods such as changing respective frequency bands used, modulation systems and a method of distinguishing signals depending on the codes of the contents, and the destination addresses of the signals can be fed as the method of the above distinction.

When the method of distinguishing the signal for CATV and the signal for a portable telephone depending on the contents of the signals is employed, two stations, that is, a selective distribution station and a center station are considered as the place where the signals are distinguished. If the signals are distinguished in the selective distribution station, the signals are demodulated before being distinguished in the selective distribution station. In the case of the signal for CATV, the CATV system performs processing corresponding to the signal for CATV. In the case of the signal for a portable telephone, the CATV system is connected to the public communication network by way of the center station or directly from the selective distribution station. The CATV system need not be connected to the public communication network if the telephone connection is made within the CATV system, whereby the signals are processed within the CATV system. If the signals are distinguished in the center station, construction such that the signals are transmitted to the center station by way of the selective distribution station and are demodulated in the center station without changing the shape of the signals halfway, as in the fifth embodiment of the present invention, is suitable.

As viewed from an operation performed by a subscriber, an operation mode for CATV and an operation mode for a portable telephone may be properly used. If an operation key for CATV and an operation key for a portable telephone are separately provided in a subscriber's transmitting device, or a key for switching the two operation modes is provided so that the same key can be shared between the two modes, as in a shared-type remote controller for household electric appliances, there is no difficulty of the operation for the subscriber.

If the scale of the CATV system is small, one center station may serve as the selective distribution station, thereby eliminating the necessity of providing a selective distribution station. In this case, both the center station and the selective distribution station can be located in the same place, whereby transmission between the center station and the selective distribution station need not be considered, thereby making it possible to construct the CATV system more economically. Even if the scale of the system is increased, the CATV system is economical as in the foregoing, provided that the center station is in the charge of an area near the center station as one selective distribution station.

There is a case where a subscriber must be informed of a response signal with respect to the up-signal for CATV serving as a request for receiving from the subscriber's device. For example, response information such as accounting information, information as to whether a signal can be received, or information on predetermined transmission is considered. In such a case, as a device for outputting the response signal, a subscriber's receiving device and a subscriber's transmitting device are considered. The subscriber's receiving device is basically a television receiver, thereby making it possible to output an image signal, a character signal and a voice signal. Therefore, the response signal can be transmitted from the selective distribution station to the subscriber's receiving device, where the signal can be outputted. A dedicated carrier wave may be provided so as to transmit the response signal, or the response signal may be transmitted with it being overlapped with the image signal. If a digital signal can be transmitted, it is easiest to transmit data dedicated to the response signal. There is no problem as to the transmission because a down-transmission line is ensured between the selective distribution station and the subscriber's receiving device.

In order to output the response signal to the subscriber from the subscriber's transmitting device, a function of transmitting the response signal and a function of receiving and outputting the response signal from the selective distribution station must be respectively added to the selective distribution station and the subscriber's transmitting device. If the subscriber's transmitting device has the function of a portable telephone terminal, and the selective distribution station has the function of a portable telephone radio base station for transmitting and receiving portable telephone signals, as described above, the two-way communication function is naturally ensured between the selective distribution station and the subscriber's transmitting device, whereby it is feasible to transmit the response signal from the selective distribution station to the subscriber's transmitting device without any problem.

In addition, a voice can be outputted as a portable telephone. If the voice output function is used, it is feasible to output the response signal by the voice. If the subscriber's transmitting device has a display portion such as a liquid crystal for a portable telephone, characters of the response signal can be displayed using the output function. In either case, the rule of transmission of the response signal must be set between the selective distribution station and the subscriber's transmitting device. Since the portable telephone has a function of transmitting and receiving data between the portable telephone and the radio base station as a basic function, it is relatively easy to transmit the response signal if this function is utilized.

In many cases, there are a plurality of subscriber's receiving devices in one subscriber's house. However, subscriber's transmitting devices need not, in some cases, be respectively assigned to all subscriber's receiving devices. In such a case, one subscriber's transmitting device may be allowed to transmit up-signals for requesting receiving corresponding to the plurality of subscriber's receiving devices. When the subscriber's transmitting device transmits the up-signal, therefore, information by which it is possible to judge which of the subscriber's receiving devices receives may be added to the up-signal. On the side of the selective distribution station, if a signal to be transmitted and information by which the subscriber's receiving device to which the signal is to be transmitted can be judged are obtained, it is not necessary to know which subscriber's transmitting device transmits the up-signal. It goes without saying that it must be confirmed that the up-signal is not an up-signal from an unrelated subscriber's transmitting device but an up-signal from a valid subscriber's transmitting device.

Even when the number of subscriber's receiving devices and the number of subscriber's transmitting devices are the same in the same subscriber, it is inconvenient for the subscriber's receiving device and the subscriber's transmitting device to have a one-to-one correspondence such that one subscriber's transmitting device can be only used with respect to one subscriber's receiving device. Therefore, it is convenient to allow each of the subscriber's transmitting devices to transmit up-signals for requesting receiving corresponding to all the subscriber's receiving devices in the same subscriber, for example, to the plurality of subscriber's receiving devices. For example, the subscriber's receiving devices and the subscriber's transmitting devices in the same subscriber may be previously registered as the same group so that the above described sharing is possible between the devices in the same group. This makes it possible to prevent the devices in the same group from being shared with devices in other groups, thereby preventing unfair use. If it is not desired to share the devices in the same subscriber, it is easy to set the system such that sharing between the devices in the same subscriber is made impossible.

Telephone numbers of portable telephones are respectively assigned to the subscriber's transmitting devices. If the subscriber's transmitting devices are respectively assigned to members of a family, each of the members can directly receive a call of the portable telephone addressed to himself or herself. As a result, the members of the family respectively possess the subscriber's transmitting devices in the subscriber's house and carry the subscriber's transmitting devices, whereby the members must be allowed to also operate all the subscriber's receiving devices in all rooms. The foregoing grouping is effective for that purpose.

One portable telephone may, in some cases, be set for one subscriber's house. In the other cases, the function of a portable telephone may not be required. Accordingly, all subscriber's transmitting devices need not serve as portable telephones. Consequently, both a device having a function dedicated to CATV and a combined device will be actually used.

According to the above described embodiments, the up-signals which are requests for receiving from the respective subscribers are transmitted by radio signals, whereby a transmission line for up-signals need not be newly provided, resulting in low facility cost. Further, no public telephone network is used for transmitting the up-signals, whereby a charge for use of a telephone line need not be paid so as to transmit the up-signals. In addition, only the signal on the channel requested to be received is transmitted from the selective distribution station to the subscriber's receiving device, whereby it is possible to avoid the danger that subscription broadcasting is being tapped in the subscriber's receiving device, and no wide-band transmission line is required between the selective distribution station and the subscriber's receiving devices.

Furthermore, the selective distribution station requests the center station to transmit the signal on the requested channel in response to the request for a channel to be received from the subscriber's transmitting device, and transmits the signal on the channel received from the center station to the subscriber's receiving device, thereby making it possible to narrow a required band of the transmission line between the center station and the selective distribution station.

Additionally, the plurality of selective distribution stations and the center station are connected to each other by the transmission line in a tree shape or a bus shape arrangement, thereby making it possible to reduce the overall length of the transmission line.

Furthermore, the selective distribution station frequency-division multiplexes the signals on the plurality of channels to be transmitted to the respective subscriber's receiving devices utilizing the frequency bands for down-signals previously assigned respectively to the subscriber's receiving devices, and transmits the signals to the subscriber's receiving devices, thereby making it possible to connect the selective distribution station and the subscriber's receiving devices by one transmission line in a bus shape arrangement. Consequently, it is possible to reduce the overall length of the transmission line. In addition, only one transmitter is required on the side of the selective distribution station, whereby the cost of the selective distribution station is lowered. Further, one transmission line is connected to the selective distribution station, whereby the physical dimensions of an outlet for a transmission line in the selective distribution station are decreased, thereby making it possible to miniaturize the selective distribution station. Since frequency-division multiplexing is employed, it is feasible to add a subscriber's receiving device if there is room for the frequency bands and if there is no restriction or limitation at the position where the subscriber's receiving device is connected to the transmission line.

Frequency bands for television broadcasting signals are assigned as the frequency bands for down-signals, thereby making it possible to construct the selective distribution station and the subscriber's receiving stations using circuits of a conventional television receiver, resulting in low manufacturing cost. Furthermore, the up-signals from the subscriber's transmitting devices are transmitted to the center station by way of the selective distribution station without changing the shape of the signals halfway, and the up-signals are demodulated in the center station and are transmitted to the selective distribution station, whereby the number of demodulators for demodulating the up-signals can be reduced, as compared with a case where the up-signals are demodulated in the selective distribution station.

Additionally, the CATV system is constructed such that the subscriber's transmitting devices have the function of a portable telephone terminal, and the selective distribution station has the function of a portable telephone radio base station capable of transmitting and receiving portable telephone signals, thereby making it possible to accept the portable telephone system in the CATV system.

Although the present invention has been described and illustrated in detail, it is clearly understood that the same is by way of illustration and example only and is not to be taken by way of limitation.

What is claimed is:

1. A CATV system for distributing and transmitting signals of a plurality of channels to a plurality of subscribers, said system comprising:

a center station for generating the signals of the plurality of channels;

a plurality of subscriber's receiving devices respectively provided for said plurality of terminals;

a plurality of subscriber's transmitting devices corresponding to said plurality of subscriber's receiving devices, wherein said plurality of subscriber's transmitting devices independently transmits requests to receive predetermined channels from the plurality of channels, as up-signals by radio frequencies; and a selective distribution station, interposed between said center station and said plurality of subscriber's receiving devices. For selectively distributing and transmitting the signals for the requested channels generated in said center station and requested by said subscriber's transmitting devices, wherein the signals for the requested channels are received by respective ones of said plurality of subscriber's receiving devices.

2. The CATV system according to claim 1, wherein:

an all-channel signal obtained by multiplexing the signals of all of the plurality of channels is transmitted by said center station to said selective distribution station; and said selective distribution station selects the signals for channels requested by said plurality of subscriber's transmitting devices from said all-channel signal and transmits the selected signals to respective ones of said plurality of subscriber's receiving devices.

3. The CATV system according to claim 1, wherein said selective distribution station requests said center station to transmit the signals for requested channels in response to requests for channels by said plurality of subscriber's transmitting devices, and transmits the signals for the requested channels received from said center station to respective ones of said plurality of subscriber's receiving devices.

4. The CATV system according to claim 3, wherein:

said selective distribution station constitutes one of a plurality of selective distribution stations which are connected to said center station by a transmission line having a tree shape or bus shape arrangement; and said selective distribution stations respectively transmit requests to transmit signals of requested channels to said center station through said transmission line in response to requests for channels from any respective ones of said plurality of subscriber's transmitting devices.

5. The CATV system according to claim 1, wherein:

said plurality of subscriber's receiving devices are connected to said selective distribution station by a transmission line having a bus shape arrangement, and wherein said plurality of subscriber's receiving devices are respectively assigned frequency bands for down-signals;

said selective distribution station frequency-division multiplexes the signals of the plurality of channels according to said assigned frequency bands for respective ones of said plurality of said subscriber's receiving devices, and transmits the frequency-division multiplexed signals to said transmission line as the down-signals; and said subscriber's receiving devices receive the signals for requested channels in accordance with said assigned frequency bands.

6. The CATV system according to claim 3, wherein said selective distribution station selects the signals for requested channels in the shape of a baseband signal or an intermediate frequency signal, modulates the signals of the channels according to said assigned frequency bands of respective ones of said plurality of said subscriber's receiving devices, frequency-division multiplexes the modulated signals, and then transmits the signals to the transmission line as the down-signals.

7. The CATV system according to claim 5, wherein:

a TDM digital signal obtained by time-division multiplexing the signals of the plurality of channels is transmitted by said center station to said selective distribution station; and said selective distribution center selects from said TDM digital signal the signals of the requested channels, modulates the selected signals for the respective channels in said assigned frequency bands for respective ones of said plurality of subscriber's receiving devices, frequency-division multiplexes the modulated signals, and then transmits the signals to said transmission line as the down-signals.

8. The CATV system according to claim 3, wherein:

an FDM signal obtained by frequency-division multiplexing the signals of the plurality of channels is transmitted by said center station to said selective distribution station; and said selective distribution station selects from said FDM signal the signals for the requested channels in the shape of a baseband signal or an intermediate frequency signal, modulates the selected signals of the respective channels in said assigned frequency bands for respective ones of said plurality of subscriber's receiving devices, frequency-division multiplexes the modulated signals, and then transmits the signals to said transmission line as the down-signals.

9. The CATV system according to claim 5, wherein:

an FDM signal obtained by frequency-division multiplexing the signals of the plurality of channels is transmitted by said center station to said selective distribution station; and said selective distribution station selects from said FDM signal the signals of the requested channels, up-converts or down-converts the selected signals for the respective channels in said assigned frequency bands for respective ones of said plurality of subscriber's receiving devices, frequency-division multiplexes the converted signals, and then transmits the signals to said transmission line as the down-signals.

10. The CATV system according to claim 5, wherein frequency bands for television broadcasting signals are assigned as the frequency bands for the down-signals.

11. The CATV system according to claim 1, wherein the up-signals from said plurality of subscriber's transmitting devices are transmitted to said center station through said selective distribution station without changing the shapes of the signals halfway, are demodulated in said center station, and then are transmitted to said selective distribution station from said center station.

12. The CATV system according to claim 1, wherein:

said subscriber's transmitting devices also have functioning capabilities of a portable telephone terminal; and said selective distribution station has functioning capabilities of a portable telephone radio base station capable of transmitting and receiving portable telephone signals.

13. The CATV system according to claim 12, wherein the up-signals from said plurality of subscriber's transmitting devices are transmitted to said center station through said selective distribution station without changing shapes of the signals halfway.

14. The CATV system according to claim 13, wherein:

said selective distribution station constitutes one of a plurality of selective distribution stations which are connected to said center station by a transmission line in a tree shape or a bus shape arrangement; and the up-signals from said plurality of subscriber's transmitting devices are transmitted to said center station through said transmission line after going through said plurality of selective distribution stations.

15. The CATV system according to claim 12, wherein said selective distribution station transmits response signals which correspond to respective up-signals from said plurality of subscriber's transmitting devices to said plurality of subscriber's receiving devices in the shapes of an image signal, a character signal, or a voice signal.

16. The CATV system according to claim 12, wherein said selective distribution station transmits response signals which correspond to respective up-signals from said plurality of subscriber's transmitting devices to said plurality of subscriber's receiving devices in the shapes of a character signal or a voice signal by radio signals.

17. The CATV system according to claim 4, wherein said center station also functions as at least one of said plurality of selective distribution stations.

18. The CATV system according to claim 1, wherein said plurality of subscriber's transmitting devices can transmit the up-signals corresponding to said plurality of subscriber's receiving devices.

19. The CATV system according to claim 1, wherein each of said subscriber's transmitting devices include means for transmitting up-signals corresponding to said plurality of subscriber's devices.

* * * * *